Sept. 6, 1960
R. A. HILL
2,951,471
STEAM ENGINE
Filed March 3, 1958
3 Sheets-Sheet 1
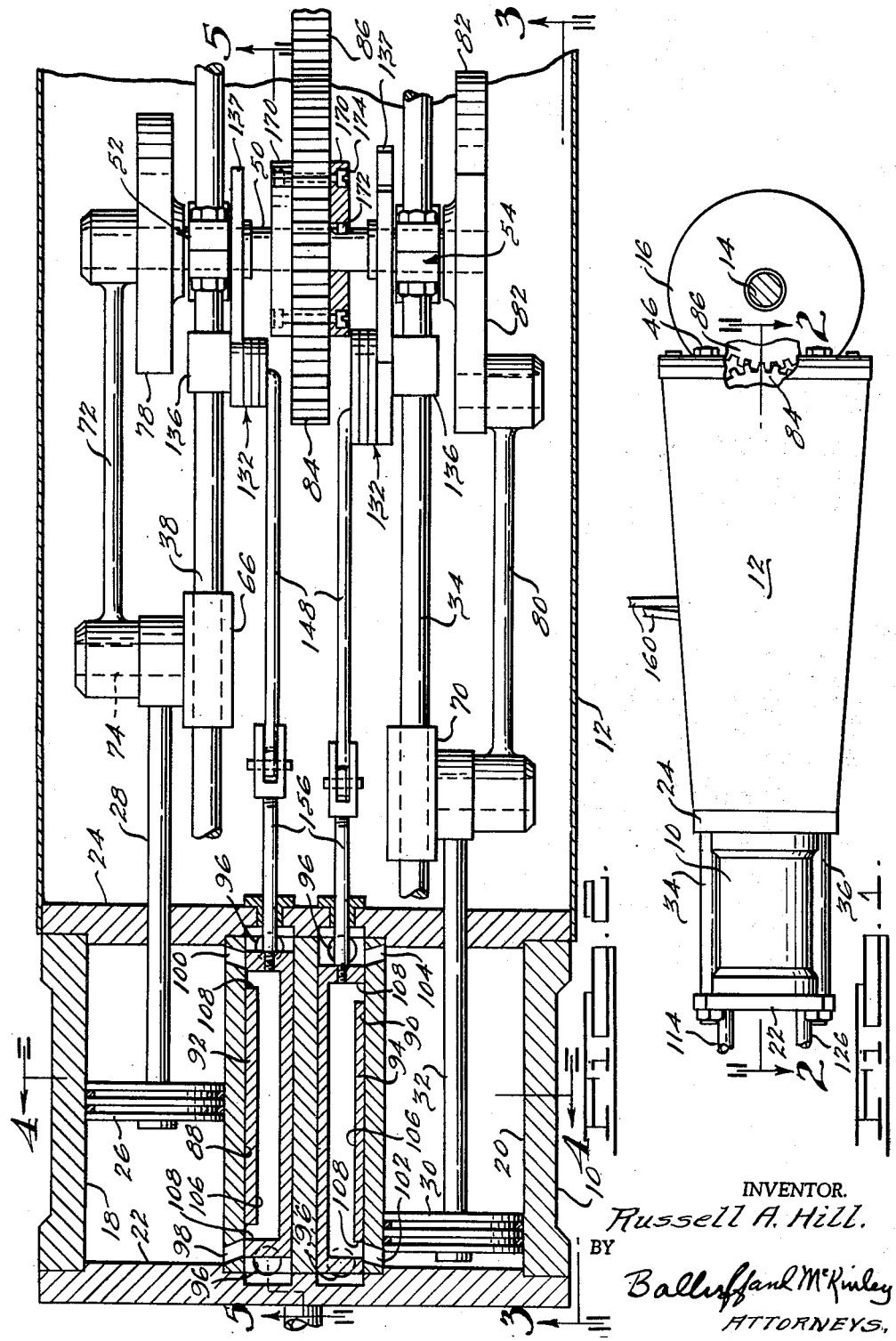
INVENTOR.
Russell A. Hill.
BY
Balluff and McKinley
ATTORNEYS.

Sept. 6, 1960 R. A. HILL 2,951,471
STEAM ENGINE
Filed March 3, 1958 3 Sheets-Sheet 2
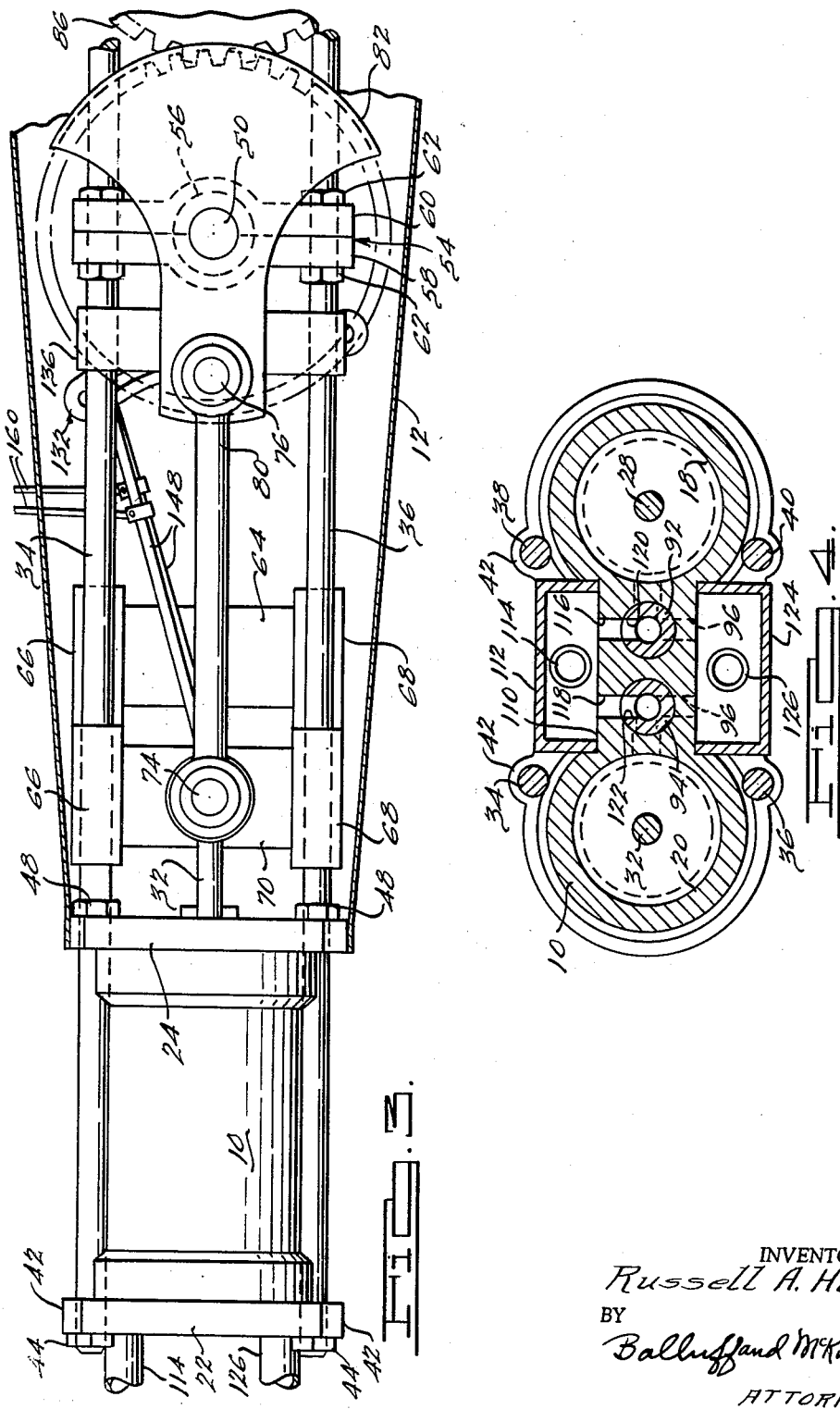
INVENTOR.
Russell A. Hill,
BY
Balluff and McKinley
ATTORNEYS.

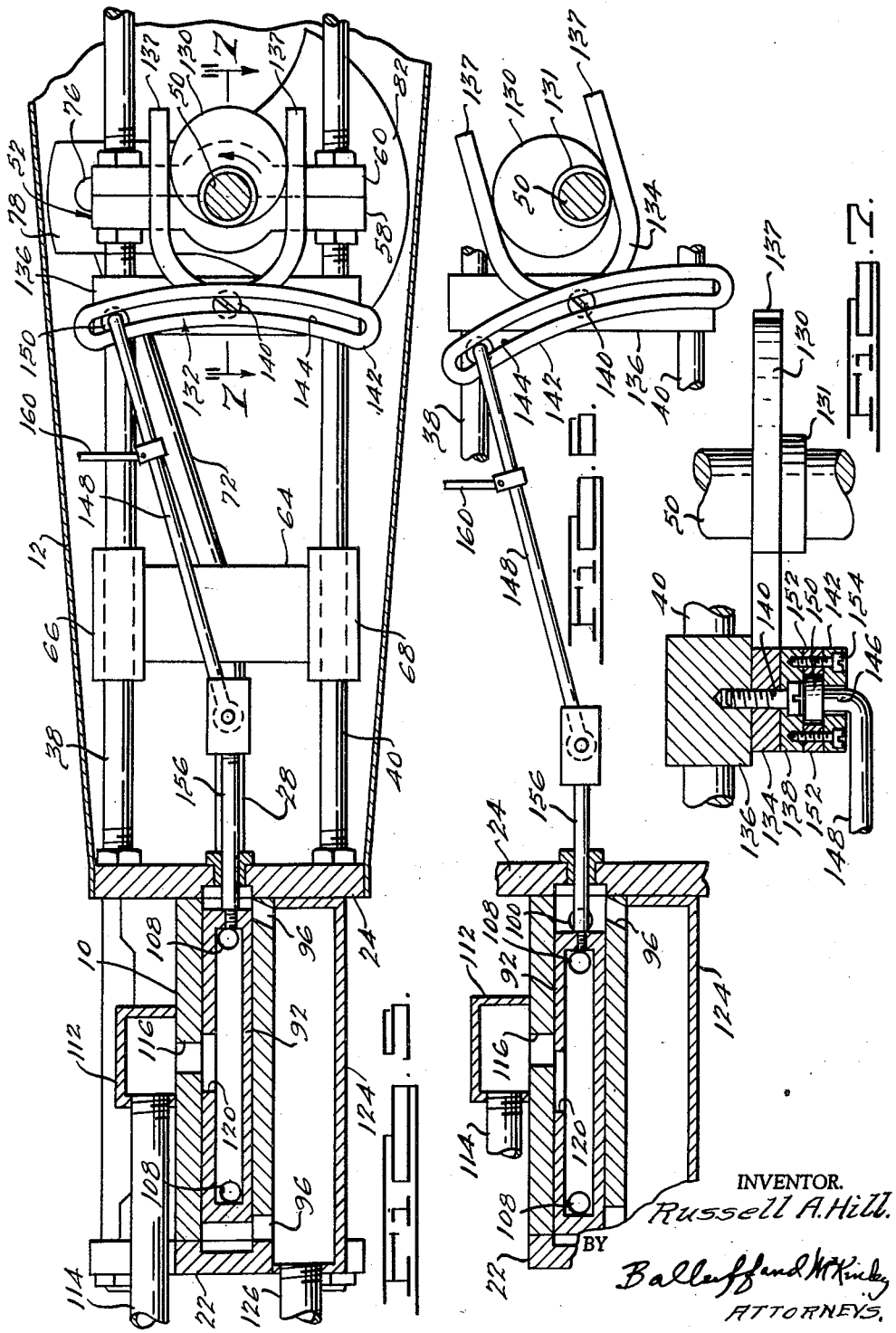

United States Patent Office 2,951,471
Patented Sept. 6, 1960

2,951,471

STEAM ENGINE

Russell A. Hill, Detroit, Mich., assignor of one-half to Richard F. Schultz, San Francisco, Calif.

Filed Mar. 3, 1958, Ser. No. 718,722

2 Claims. (Cl. 121—165)

This invention relates to steam engines and has particular reference to a new and improved valve and valve control mechanism for a steam engine.

A principal object of the invention is to provide a steam engine suitable for use as the power plant in an automotive vehicle or other vehicle such as a boat, or as a portable or stationary power plant adapted to any other use.

A further object of the invention is to provide an improved valve mechanism for use in a steam engine.

Another object of the invention is to provide a valve for a steam engine which offers no resistance to manual shifting of the valve to obtain forward or reverse drive from the engine.

Another object of the invention is to provide a steam engine valve and control means for the valve which are simple in construction and efficient in operation.

Other and further objects of the invention will be apparent from the following description and claims and may be understood by reference to the accompanying drawings, of which there are three sheets, which by way of illustration show a preferred embodiment of the invention and what I now consider to be the best mode in which I have contemplated applying the principles of my invention. Other embodiments of the invention may be used without departing from the scope of the present invention as set forth in the appended claims.

In the drawings:

Fig. 1 is a side elevational view of a steam engine embodying the present invention;

Fig. 2 is a horizontal sectional view taken on line 2—2 of Fig. 1;

Fig. 3 is a sectional view taken on line 3—3 of Fig. 2;

Fig. 4 is a sectional view taken on line 4—4 of Fig. 2;

Fig. 5 is a sectional view taken on line 5—5 of Fig. 2;

Fig. 6 is a view similar to Fig. 5 but showing the valve in a different position thereof; and Fig. 7 is a sectional view taken on line 7—7 of Fig. 5.

In the drawings there is illustrated a two cylinder steam engine which may be adapted to any use, but is particularly suitable for use in an automotive vehicle. The engine includes a cylinder block 10 and a crankcase 12 and may be suitably mounted with the cylinders horizontally disposed, as shown in Fig. 1. The rear axle of the vehicle is indicated at 14 and the engine extends rearwardly from the rear axle housing 16 which supports the crankcase end of the engine.

The cylinder block 10 is provided with two spaced and parallel cylinder bores 18 and 20 which are closed at one end by an end plate 22 and at the other end by a plate 24 suitably secured to the cylinder block 10. The cylinder 18 is provided with a piston 26 having a piston rod 28 and the cylinder 20 is provided with a piston 30 having a piston rod 32. The piston rods 28 and 32 extend through the end plate 24.

The cylinder and crankcase are assembled by means of four stanchions 34, 36, 38 and 40 which extend through ears 42 on the end plates 22 and 24 and are provided with threads receiving nuts 44 at one end thereof. The stanchions pass through the interior of the crankcase 12 and are threaded at their other ends to receive nuts 46 to securely bolt the crankcase to the cylinder block. The end wall 24 is also tightened up against the cylinder block 10 by nuts 48 threaded onto an intermediate portion of the stanchions.

The engine crankshaft 50 is journaled in two split bearings 52 and 54 supported from the stanchions 34, 36, 38 and 40. The split bearings are similar in construction and each comprises a split bronze bearing 56 supported by two bearing plates 58 and 60 through which two of the stanchions pass and which are maintained in assembled relation by nuts 62 threaded onto the stanchions and tightened up against the bearing plates 58 and 60. One end of the crankshaft 50 is therefore supported in the split bearing 52 from the stanchions 38 and 40, while the other end of the crankshaft is journaled in the split bearing 54 which is supported from the stanchions 34 and 36.

A crosshead 64 is provided with upper and lower sleeve portions 66 and 68 for slidably supporting the crosshead 64 on the stanchions 38 and 40. A crosshead 70 of similar construction is slidably supported on the stanchions 34 and 36. The piston rod 28 is secured to the crosshead 64 and the piston rod 32 has its outer end secured to the crosshead 70. A connecting rod 72 has one end journaled on a pin 74 projecting from the crosshead 64 and its other end journaled on a pin 76 secured to a counterweight 78 which is secured to and rotatable with the crankshaft 50. A similar connecting rod 80 connects the piston 30 to a second counterweight 82 secured on the crankshaft 50. Reciprocation of the pistons 26 and 30 will therefore result in rotation of crankshaft 50. A spur gear 84 mounted on and rotatable with crankshaft 50 is meshed with a drive gear 86 secured on the rear drive axle 14 of the vehicle to drive the vehicle upon operation of the engine.

The cylinder block 10 is provided with two parallel valve bores 88 and 90 receiving valves 92 and 94 respectivly. The valve bores are each provided with an exhaust port 96 adjacent each end thereof. The cylinder 18 is provided with passages 98 and 100 at its opposite ends opening into the valve bore 88 adjacent but inwardly of the exhaust ports 96 in the bore 88. The cylinder 20 is provided with similar passages 102 and 104 at its opposite ends opening into the valve bore 90.

The valves 92 and 94 are identical in construction and each comprises a cylindrical valve body having a central passage 106 and radially extending ports 108 at opposite ends of the central passage 106. As shown in Fig. 4, the cylinder block 10 is provided with a flat upper surface 110 on which is seated a steam chest 112 supplied with steam under pressure from a suitable source through an inlet pipe 114. The box-like structure 112 is hollow and the cylinder block is provided with a pair of passages 116 and 118 communicating with elongated slots 120 and 122 in the piston valves 92 and 94 respectively. The central passages 106 of the valves 92 and 94 are therefore continually supplied with steam under pressure when the controls are set to supply steam through the supply pipe 114.

An exhaust box 124 is suitably secured on the underside of the cylinder block 10 and the exhaust ports 96 open into the exhaust box 124 from which exhaust steam is returned to the system by the exhaust pipe 126.

Each of the valves 92 and 94 is provided with a valve operating mechanism as illustrated in Figs. 5, 6 and 7, the operating mechanisms for the two valves being identical and therefore only one of such devices will be described. An eccentric 130 secured on crankshaft 50 by a collar 131 is adapted to oscillate a valve actuating member 132, which includes a yoke 134 pivotally mounted on a crosshead 136 secured on the stanchions 38 and 40 and provided with arms 137 straddling the eccentric 130. A plate 138 is counterbored to receive the head of a bolt 140 which extends through an aperture in the yoke 134 and is threaded into the crosshead 136, the yoke 134 being pivotally supported on the bolt 140. An outer plate 142 is provided with an arcuate slot 144 receiving the inwardly turned end 146 of a control rod 148 having an enlarged head 150 engaging the inner side of the plate 142 to retain the end of the control rod 148 within the slot 144. The plate 142 is spaced from the plate 138 by blocks 152 and is secured to the plate 138 by screws 154. The other end of the control rod 148 is pivotally connected to a rod 156 secured to one end of its valve 92 or 94.

Rotation of crankshaft 50 and the eccentric 130 secured thereon will cause the yokes 134 and the plates 142 secured thereto to oscillate on bolts 140, and such oscillation of the yokes 134 will cause the valves 92 and 94 to be reciprocated if the control rods 148 are shifted out of their neutral positions. The neutral position of the control rods is at the center or pivot point of the plate 142 and, with the control rod in such position, no reciprocation of the valve will take place when the yoke is oscillated through rotation of the crankshaft.

The control rods are each provided with an actuating rod 160 under manual control of the operator for shifting the control rods to a position selected according to the direction of drive and power output desired. The control rods are illustrated in the drawings in the position they would occupy for forward drive of the vehicle, reverse drive being obtained when the control rods are shifted beyond the pivot points 140 into the lower half of the slots 144. Referring to Figs. 2, 5 and 6, the piston 26 has completed about one-half of its stroke toward the left-hand end of the cylinder 18, and the valve 92 is therefore in an intermediate or half-way position between its limits of movement. An additional 90° rotation of the crankshaft in a counterclockwise direction will cause the eccentric 130 to oscillate the yoke 134 into the position shown in Fig. 6 in which the actuating member 132 and the control rod 148 have shifted the valve 92 to the end of its stroke, thereby exhausting the right-hand end of the cylinder 18 through the passage 100 and the adjacent exhaust port 96 and establishing communication between the valve port 108 and the cylinder passage 98 to supply steam under pressure to the left-hand end of the cylinder for the return stroke of the piston 26. Further rotation of the crankshaft will cause the piston 26 and the valve 92 to shift to the right-hand end of the cylinder 18, thereby porting the left-hand end of the cylinder 18 through passage 98 and establishing communication between the right-hand valve port 108 and the cylinder passage 100.

The construction and operation of the other cylinder 20 and its valve 94 and valve control mechanism is identical to that described, except that the two pistons and their related valve structures are offset 90° from each other or, in other words, the piston 30 and the valve 94 lead the piston 26 and valve 92 by 90°. The two control rods 148 are shifted together to the same position in their respective slots 144, and any suitable manual control means may be employed for this purpose. The extent to which the control rods 148 are shifted away from the pivot points 140 of the actuating member 132 will determine the extent of valve reciprocation and therefore will determine the power output of the engine. The slots 144 in the plates 142 are formed on a radius equal to the length of the control rods 148.

The gear 84, which is meshed with the main drive gear 86, is not keyed onto or otherwise secured to the crankshaft 50 but is freely rotatable thereon. The gear 84 is driven from the crankshaft 50 through the provision of two plates 170 on either side thereof and each of which has a keyed connection 172 with the crankshaft 50. Each plate 170 is bolted to the adjacent face of the gear 84 by a series of bolts 174. This construction is provided for the purpose of allowing the vehicle to be towed. All that is necessary to provide for towing of the vehicle is to remove the bolts 174 from the plates 170 whereupon the gear 84 is free to rotate on the crankshaft 50. This operation may be accomplished quite readily and with very little inconvenience since a suitable access opening may be provided in the crankcase directly above gear 84.

It will be noted that the valve construction disclosed herein is such that both valves may readily be shifted by the control rods and that the valves are subjected to substantially equal and low pressures at opposite ends thereof at all times by the provision of the exhaust ports 96 at opposite ends of the valve bores. It is therefore not necessary to move the valves against the pressure steam since any steam which may be present at the end of the bore toward which the valve is moved may escape through the related exhaust port 96.

The present invention provides a steam engine suitable for use as the motive power of a steam car, boat or other use, but eliminates may of the valve and control problems that were present in prior steam engines designed for such uses. The steam boiler and related control devices form no part of the present invention and are therefore not disclosed herein.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. In a steam engine, a cylinder block having a pair of parallel bores therein, an end plate at each end of said block closing said cylinder bores, a plurality of stanchions extending through aligned openings in said end plates and disposed exteriorly of said cylinder block, means on said stanchions for securing said end plates against said cylinder block, a crankcase secured to said cylinder block, said stanchions extending through the interior of said crankcase, means threaded onto said stanchions for securing said crankcase to said cylinder block, a pair of split bearings secured on said stanchions within said crankcase, a crankshaft rotatably journaled in said bearings, a piston in each of said cylinders, a pair of crossheads slidably supported on said stanchions within said crankcase, each piston having a piston rod extending through one of said end plates and connected to one of said crossheads, connecting rods connecting each of said crossheads to said crankshaft, reciprocable valve means associated with each cylinder for controlling the supply of steam to said cylinder, and actuating means for each valve for effecting reciprocation thereof, comprising an actuating member supported from said stanchions for oscillation on a fixed axis, said member having an arcuate slot therein passing through said axis, a valve control rod having one end pivotally connected to said reciprocable valve and its other end disposed within said slot, and an eccentric on said crankshaft and engageable with said actuating member to oscillate the same and threaded means on said stanchions for securing said bearings thereon at an adjusted position along the length of said stanchions.

2. In a steam engine, a cylinder block having a pair of parallel bores therein, an end plate at each end of said block closing said cylinder bores, a crankcase, a plurality of parallel stanchions secured at one end to said cylinder block, said stanchions extending through the interior of said crankcase, means threaded onto said stanchions for securing said crankcase to said cylinder block, a pair of bearings secured on said stanchions within said crankcase, a crankshaft rotatably journaled in said bearings, a piston in each of said cylinders, a pair of crossheads slidably supported on said stanchions within said crankcase, each piston having a piston rod connected to one of said crossheads, connecting rods connecting each of said crossheads to said crankshaft, and threaded means on said stanchions for securing said bearings thereon at an adjusted position along the length of said stanchions.

References Cited in the file of this patent

UNITED STATES PATENTS

| | | |
|---|---|---|
| 462,182 | Vandergrift | Oct. 27, 1891 |
| 490,308 | Pitceathly | Jan. 24, 1893 |
| 689,567 | Secor | Dec. 24, 1901 |
| 946,110 | Clark | Jan. 11, 1910 |
| 1,254,281 | Salway | Jan. 22, 1918 |
| 1,329,878 | Barrett | Feb. 3, 1920 |
| 1,845,288 | Knox | Feb. 16, 1932 |
| 1,972,752 | Balough | Sept. 4, 1934 |
| 2,453,640 | Pigg | Nov. 9, 1948 |
| 2,648,198 | McGauchie | Aug. 11, 1953 |